(12) United States Patent
He et al.

(10) Patent No.: US 10,380,223 B2
(45) Date of Patent: Aug. 13, 2019

(54) SUPPORT TENSOR MACHINE BASED NEUTRAL POINT GROUNDING MODE DECISION METHOD AND SYSTEM

(71) Applicants: State Grid Zhejiang Electric Power Company Limited, Hangzhou, Zhejiang (CN); State Grid Zhejiang Economic Research Institute, Hangzhou, Zhejiang (CN); State Grid Ningbo Electric Power Supply Company Limited, Ningbo, Zhejiang (CN); Zhejiang Huayun Electric Power Engineering Design Consulting Co., LTD, Hangzhou, Zhejiang (CN)

(72) Inventors: Yingjing He, Zhejiang (CN); Yangqing Dan, Zhejiang (CN); Weijun Liu, Zhejiang (CN); Weimin Zheng, Zhejiang (CN); Xiaodi Zhang, Zhejiang (CN); Chaoming Zheng, Zhejiang (CN); Xiran Wang, Zhejiang (CN); Shuyi Shen, Zhejiang (CN); Yan Yao, Ningbo (CN); Yanwei Zhu, Ningbo (CN); Fan Li, Zhejiang (CN); Lin Zhou, Zhejiang (CN); Jiandi Fang, Ningbo (CN); Dan Yu, Hangzhou (CN); Ren Tang, Hangzhou (CN)

(73) Assignees: STATE GRID ZHEJIANG ELECTRIC POWER COMPANY LIMITED, Hangzhou, Zhejiang (CN); STATE GRID ZHEJIANG ECONOMIC RESEARCH INSTITUTE, Hangzhou, Zhejiang (CN); STATE GRID NINGBO ELECTRIC POWER SUPPLY COMPANY LIMITED, Ningbo, Zhejiang (CN); ZHEJIANG HUAYUN ELECTRIC POWER ENGINEERING DESIGN CONSULTING CO. LTD, Hangzhou, Zhejiang (CN)

(*) Notice: Subject to any disclaimer, the term of this patent is extended or adjusted under 35 U.S.C. 154(b) by 24 days.

(21) Appl. No.: 15/911,887

(22) Filed: Mar. 5, 2018

(65) Prior Publication Data
US 2019/0121836 A1     Apr. 25, 2019

(30) Foreign Application Priority Data

Oct. 23, 2017   (CN) .......................... 2017 1 0992854

(51) Int. Cl.
| | | |
|---|---|---|
| *G06F 17/16* | (2006.01) | |
| *G06Q 50/06* | (2012.01) | |
| *G06F 17/18* | (2006.01) | |

(52) U.S. Cl.
CPC .............. *G06F 17/16* (2013.01); *G06F 17/18* (2013.01); *G06Q 50/06* (2013.01)

(58) Field of Classification Search
CPC .......... G06F 17/16; G06F 17/18; G06Q 50/06
(Continued)

(56) References Cited

U.S. PATENT DOCUMENTS

8,965,590 B2 *  2/2015  Boardman .......... H02J 13/0079
                                                700/289
9,639,103 B2 *  5/2017  Darden, II ............. H02J 3/381
(Continued)

*Primary Examiner* — Tan V Mai
(74) *Attorney, Agent, or Firm* — Muncy, Geissler, Olds & Lowe, P.C.

(57) ABSTRACT

A support tensor machine based neutral point grounding mode decision method and system adopts a support tensor machine method Based on three indexes, i.e., the power supply reliability index, safety index, and economical efficiency index, influences of different neutral point grounding modes are analyzed by employing the support tensor machine method to finally obtain a neutral point grounding mode capable of maximizing power supply reliability of a distribution network.

20 Claims, 4 Drawing Sheets

(58) Field of Classification Search
USPC .......................................................... 708/520
See application file for complete search history.

(56) References Cited

U.S. PATENT DOCUMENTS

| | | | |
|---|---|---|---|
| 9,648,143 B2* | 5/2017 | Laval | H04L 69/03 |
| 9,933,804 B2* | 4/2018 | Janous | G05B 15/02 |
| 9,952,611 B2* | 4/2018 | Forbes, Jr. | G05B 15/02 |
| 9,979,192 B2* | 5/2018 | Shao | G05B 15/02 |
| 10,088,859 B2* | 10/2018 | Forbes, Jr. | H02J 3/14 |
| 2009/0281674 A1* | 11/2009 | Taft | G01D 4/002 |
| | | | 700/286 |

* cited by examiner

SUPPORT TENSOR MACHINE BASED NEUTRAL POINT GROUNDING MODE DECISION METHOD AND SYSTEM

TECHNICAL FIELD

The present invention belongs to the field of power network optimization and particularly relates to a neutral point grounding mode decision method and system for a medium voltage distribution network, based on a support tensor machine and considering multi-factor influences.

BACKGROUND ART

With the development of the national economy, a structure of a distribution network tends to be complicated. Since the distribution network has an increase in power supply density, is related to a large population, and mostly is deployed in economically developed large and medium-sized cities, the deployment of the distribution network is related to reliable transmission of electricity and directly affects the economic development; about 80% of failures in a distribution network belong to the type of a single-phase ground failures. Different grounding modes directly affect apower supply reliability of a power system, the grounding mode is also affected by the relay protection of the power system, electromagnetic interference of communication signals, electrical safety and grounding devices; and especially, a deployment cost of neutral point grounding is also an important factor determining the neutral point grounding. It thus can be concluded that the neutral point grounding mode is affected by a variety of factors, and an optimal neutral point grounding mode can only be obtained when all aspects of factors are required to be considered comprehensively.

According to analysis, the influencing factors can be divided into three categories, namely, a power supply reliability of a medium voltage distribution network, safety of the medium voltage distribution network and economical efficiency of deployment of a neutral point grounding mode. In these three categories, the power supply reliability of the medium voltage distribution network is affected by many factors, which can be attributed to a node failure probability and a branch failure probability, and related to the line deployment mode of the distribution network, the topological structure of the distribution network and the transmission performance of the distribution network; the safety of the distribution network depends mainly on vulnerability of the distribution network, safety of a communication system and a control system; and the economical efficiency mainly depends on factors such as a fault probability of a distribution network, a troubleshooting cost, and a deployment cost of neutral point grounding. However, among these three major types of parameter indexes, there are interrelationships among various indexes; and traditional data analysis is carried out in a vector form. For such a problem having a large number of influencing factors and data related to one another, when data is vectorized according to a multimodal mode, results of information loss, the curse of dimensionality or the like are caused, and a problem in multimodal data analysis cannot be solved.

In recent years, as an extended form of a vector, a tensor form of a matrix not only can guarantee the interrelationships of each data, but also can help analysis and mining of information data without appearance of the problem of the curse of dimensionality. In the traditional data mining algorithms, Support Vector Machine (SVM) is a pattern recognition method based on a statistical learning theory, which greatly increases the calculation complexity in solving high-dimensional problems. For this problem, a data analysis method of Support Tensor Machine (STM) is proposed to effectively solve the problem in high-dimensional data analysis and mining.

SUMMARY OF THE INVENTION

The technical problem to be solved in the present invention is to overcome the above defects present in the prior art and to provide a neutral point grounding mode decision method for a medium voltage distribution network, based on a support tensor machine and considering multi-factor influences, to improve the power supply reliability, safety and economical efficiency of the medium voltage distribution network.

For this purpose, the present invention adopts the following technical solution: a neutral point grounding mode decision method of a medium voltage distribution network, including:

Step A, constructing a power supply reliability evaluation system according to a topological structure of a medium voltage distribution network and calculating a related index;

Step B, calculating a safety-related index of the distribution network according to related factors that affect the safety;

Step C, constructing an economic evaluation index system of the distribution network and calculating a related index;

Step D, constructing the power supply reliability index, the safety index of the distribution network and the economic evaluation index of the distribution network into a tensor form and decomposing the tensor form; and Step E, constructing a support tensor machine kernel function, determining an optimization function and obtaining an optimal neutral point grounding mode via analysis.

As a supplement to the above technical solution, Step A specifically includes the following steps:

A1, constructing a topology G=(V,E) of a network structure according to the structure of the distribution network, wherein V represents a set of all nodes, and E represents a set of edges connecting all the nodes;

A2, calculating a weight value $r_{ij}$ of a branch, $r_{ij}=\alpha_m d_{ij}$, i, j=1, 2,3 ... ,n; m=1,2, ... , k; wherein $d_{ij}$ is a distance between nodes, and $\alpha_m$ represents weighting coefficients in different scenarios;

A3, calculating a node current fluctuation value, $$G_i = \frac{\sigma_i}{\langle F_i \rangle - \sigma_i},$$

wherein $\sigma_i$ represents a standard deviation of current flowing through a node i, and $\langle F_i \rangle$ represents average current;

A4, calculating an electrical betweenness of a branch, $$Q(i, j) = \left| \sum_{m \in F, n \in L} w_{mn} P_{ij}(m, n) \right|,$$

wherein F is a set of electrical energy supply nodes, L is a set of load nodes; $P_{ij}$ (m, n) represents a power generated by an electrical energy supply node m and a load node n, with a direction thereof from the node m to the node n; $w_{mn}$ is a weighting coefficient of a branch from the node m to the node n;

A5, calculating a failure probability of each node according to the parameters, such as $G_i$, $r_{ij}$ or the like obtained in Step A, wherein a failure probability of a node i is $$Pr(i) = \beta_i \frac{M_i G_i d_i}{r_{ij} C_i \langle F_i \rangle},$$

wherein $d_i$ is a distance of a node i, and $\beta_i$ is a value for the laying mode of the node i, the value being one of values under two situations of overhead line laying and cable trench laying; $C_i$ is the convergence of the node i, which is defined as $$C_i = \frac{\hat{D} - D}{\hat{D}},$$

wherein D is the convergency degree of the network node i, $\hat{D}$ is the convergency degree after topology simplification, and $$D = \frac{N}{d},$$

wherein d represents the average link length of the distribution network, N is the total number of nodes in the network; the sum of out-degree and in-degree is collectively referred to as degree, indicated by a symbol $M_i$;

A6, calculating a relative node betweenness, $$\hat{Q}_D(k) = \frac{Q_D(k)}{\overline{Q}_D},$$

wherein $\overline{Q}_D$ is an average electrical betweenness of all nodes, and $Q_D(k)$ represents an electrical betweenness of a load node k;

A7, calculating a relative betweennessof a branch, wherein a relative betweenness of a branch i–j is $$\hat{Q}_E(i, j) = \frac{Q_E(i, j)}{\overline{Q}_E},$$

where $\overline{Q}_E$ is an average electrical betweenness of all branches, and $Q_E(i, j)$ represents the electrical betweenness of the branch i–j;

A8, calculating loads of each node and each branch, $P_D(k)=\overline{P}_D \cdot \hat{Q}_D(k)$ and $P_E(i, j)=\overline{P}_E \cdot \hat{Q}_E(i, j)$, wherein $\overline{P}_D$ is an average node load, and $\overline{P}_E$ is an average edge load; and A9, calculating a length of a feature path, $$L = \frac{2}{N(N-1)} \sum_{i,j \in V} u_{ij},$$

wherein L is the length of the feature path, N represents the number of nodes in the considered network, $u_{ij}$ is the shortest path distance between the node i and the node j, and V is a set of all scopenodes in the considered network.

As a further supplement to the above technical solution, in Step A2, according to an environment in which the line is located, the weighting coefficient has a value range of $0 < \alpha_m \le 1$.

As a supplement to the above technical solution, Step B specifically includes the following steps:

B1, performing statistics of related parameters: a large-area failure probability r of a distribution network communication system, a failure probability M of a mobile cellular network, a failure probability W of a wireless sensor network, a failure probability F of optical fiber communication (EPON and GPON), and a defeat trip probability J of an automation system; and B2, calculating a safety index of a distribution network as $S = 1 - \tau \cdot M \cdot W \cdot F \cdot J$.

As a supplement to the above technical solution, Step C specifically includes the following steps:

C1, calculating an equipment configuration cost, $$M = \sum_{i=1}^{m} \left[ \frac{k(1+k)n_i}{(1+k)^{n_i} - 1} p_i + s_i \right],$$

wherein $s_i$ is a cost for purchasing each equipment, m represents the number of items for the equipment configuration cost, $n_i$ represents a service life of equipment i, k represents an interest per year on a purchase fund, and $p_i$ is front-end investment for the equipment i;

C2, calculating an equipment maintenance expense, $$R = \sum_{i=1}^{n} r_i + K,$$

wherein $r_i$ represents a maintenance expense of item i, and K represents a maintenance expense of an entire network;

C3, calculating an equipment retirement expense, $$X = \sum_{i=1}^{l} \left[ \frac{k(1+k)n_i}{(1+k)^{n_i} - 1} Q_i \right] - Z,$$

wherein $\iota$ is a number of equipment, $Q_i$ is a retirement expense of equipment i, Z is an expense for selling retirement equipment, and $n_i$ represents a service life of equipment i, and C4, calculating an economic loss caused by power outage, $O = \mu A_{zc} d + Q(i, j) \overline{c} + Pr(i) \overline{e}$, wherein $A_{zc}$ is an amount of power shortage corresponding to each of different neutral point grounding modes, $\mu$ is the time period coefficient of the power outage loss, and d is a ratio of a power generation quantity to a power consumption quantity; $\overline{c}$ is an average economic loss of failure per unit area; $\overline{e}$ represents an economic loss of failure per unit node; Q(i, j) represents an electrical betweenness of a branch; and Pr(i) represents a failure probability of a node i. As a further supplement to the above technical solution, when power outage takes place in a period of power consumption peak, the value of $\mu$ is 2, or otherwise, the value of $\mu$ is 1.

As a supplement to the above technical solution, Step D specifically includes the following steps:

D1, according to the above three types of indexes, constructing a tensor data form with its tensor machine represented in a form of p:U×V×$C_1$×$C_2$×L×$C_n$→D; wherein data is defined as P∈$p^{n×m×k}$, and U, V and C represent k indexes for economical efficiency, m indexes for safety of a distribution network, and n indexes for power supply reliability of the distribution network, respectively; and D2, according to the nature of the decomposition uniqueness of a three-dimensional matrix, decomposing a data matrix P∈$p^{n×m×k}$ into $\hat{P}=G^{(m)}×_1 U^{(1)}×_2 V^{(2)}×_3 \hat{P}_{i_3}^{(3)}$, wherein $\hat{P}$ represents a decomposition matrix of data, $G^{(m)}$, $U^{(1)}$, $V^{(2)}$ and $\hat{P}_{i_3}^{(3)}$ represent a neutral point grounding mode after decomposition, k indexes for the economical efficiency, m indexes for the safety of the distribution network, and n indexes for the power supply reliability of the distribution network, respectively.

As a supplement to the above technical solution, Step E specifically includes the following steps:

E1, defining the distance between an estimation matrix and an observation matrix, $$L(\hat{P}_{i_3}^{(3)}, P_{i_3}^{(3)}) = \frac{\hat{P}_{i_3}^{(3)} \otimes P_{i_3}^{(3)}}{tr(\|\hat{P}_{i_3}^{(3)}\|_F) tr(\|P_{i_3}^{(3)}\|_F)},$$

wherein ⊗ represents a tensor machine of a matrix and $\|\cdot\|_F$ represents the Frobenius norm of a matrix; tr(•) represents trace of a matrix; $\hat{P}_{i_3}^{(3)}$ represents the observation matrix and $P_{i_3}^{(3)}$ represents the estimation matrix;

E2, calculating a prior probability, $p(C_{j:})=N(c_{j:}|\mu_{c_j}, \Sigma)$, wherein its mean value and variance are $\mu_{c_j}$ and $\Sigma$ respectively; N(•) is a normal distribution, $C_{j:}$ is a power supply reliability index j;

E3, calculating a joint probability distribution, $p(C_{j:}; G^{(m)}|_{m=1}^{4}, U^{(1)}, V^{(2)}, \hat{P}_{i_3}^{(3)})$, in which there are $G^{(m)}$, $U^{(1)}$, $V^{(2)}$ and $\hat{P}_{i_3}^{(3)}$, wherein $G^{(m)}$ represents a neutral point grounding mode, $U^{(1)}$ represents an economical efficiency index after decomposition, $V^{(2)}$ represents a safety index after decomposition, and $\hat{P}_{i_3}^{(3)}$ represents a power supply reliability index after decomposition;

E4, calculating gradients of $G^{(m)}$, $U^{(1)}$, $V^{(2)}$ and $\hat{P}_{i_3}^{(3)}$;

E5, performing iteration to obtain optimal $U^{(1)}$, $V^{(2)}$, $\hat{P}_{i_3}^{(3)}$ and $G^{(m)}$; and E6, obtaining a grounding mode, under which the objective function is minimized, according to different neutral point grounding modes.

Another object of the present invention is to provide a neutral point grounding mode decision system for a medium voltage distribution network, including:

A power supply reliability related index calculation unit to construct a power supply reliability evaluation system according to a topological structure of a medium voltage distribution network and calculate a related index;

a safety-related index calculation unit to calculate a safety-related index of the distribution network according to related factors that affect the safety;

an economical efficiency-related index calculation unit to construct an economic evaluation index system of the distribution network and calculate a related index;

a multi-index tensor data constructing and decomposing unit to construct the power supply reliability index, the safety index of the distribution network and the economic evaluation index of the distribution network into a tensor form and decompose the tensor form; and an optimal neutral point grounding mode determining unit to construct a support tensor machine kernel function, determine an optimization function and obtain an optimal neutral point grounding mode via analysis.

As a supplement to the above neutral point grounding mode decision system, the multi-index tensor data constructing and decomposing unit comprises:

a distance calculation module for an estimation matrix and an observation matrix to calculate the distance between the estimation matrix and the observation matrix;

a prior probability calculation module to calculate a prior probability;

a joint probability calculation module to calculate a joint probability; and a decomposed matrix gradient calculation module to calculate a gradient of a decomposed matrix.

By utilizing the characteristics of a support tensor machine, the present invention can find an optimal solution in the case where there are connections among multiple types of data. The present invention comprehensively considers the reliability, safety and economical efficiency indexes of the medium voltage distribution network to obtain the optimal neutral point grounding mode through calculation.

DETAILED DESCRIPTION OF THE PREFERRED EMBODIMENTS

The present invention is further described in combination with the accompanying drawings and detailed description.

Embodiment 1

Figure 1:
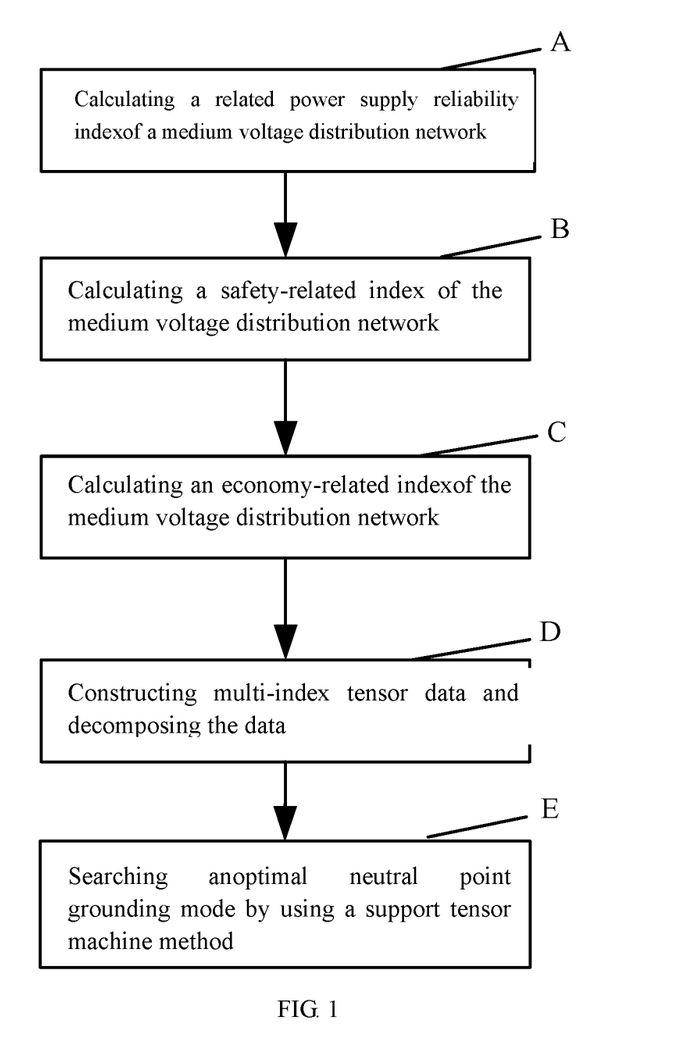
FIG. 1 is a flowchart of a method in Embodiment 1 of the present invention.

A neutral point grounding mode decision method for a medium voltage distribution network, as shown in FIG. 1, comprises:

Step A, constructing a power supply reliability evaluation system according to a topological structure of a medium voltage distribution network and calculating a related index;

Step B, calculating a safety-related index of the distribution network according to related factors that affect the safety;

Step C, constructing an economic evaluation index system of the distribution network and calculating a related index;

Step D, constructing the power supply reliability index, the safety index of the distribution network and the economic evaluation index of the distribution network into a tensor form and decomposing the tensor form; and Step E, constructing a support tensor machine kernel function, determining an optimization function and obtaining an optimal neutral point grounding mode via analysis.

Figure 2:
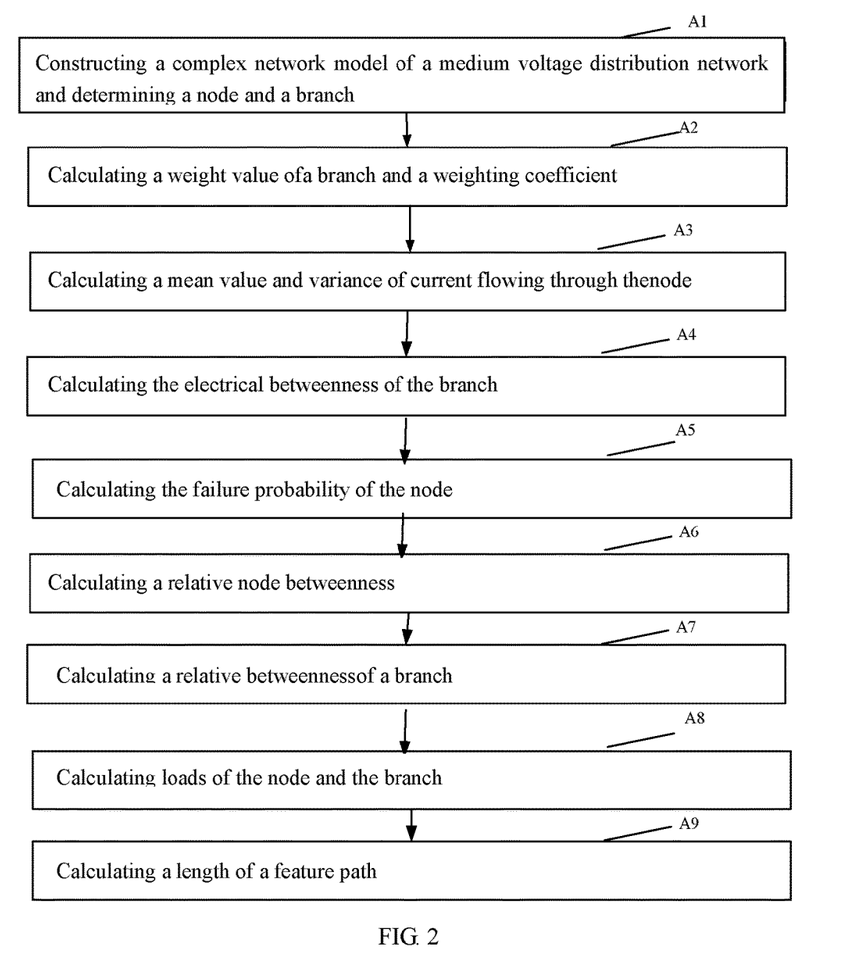
FIG. 2 is a calculating flowchart of a power supply reliability index of a medium voltage distribution network in the method in Embodiment 1 of the present invention.

As shown in FIG. 2, specific steps for calculating the power supply reliability index of the medium voltage distribution network are as follows:

Step A1 is to construct a topology G=(V, E) of a network structure according to the structure of the distribution network, where V represents a set of all nodes, and E represents a set of edges connecting all the nodes.

Step A2 is to calculate a weight value $r_{ij}$ of a branch, $r_{ij}=\alpha_m d_{ij}$, i, j=1,2,3 . . . ,n; m=1, 2, . . . ,k; wherein $d_{ij}$ is a distance between nodes, and $\alpha_m$ represents weighting coefficients in different scenarios.

Step A3 is to calculate a current fluctuation value of a node, $$G_i = \frac{\sigma_i}{\langle F_i \rangle - \sigma_i},$$

where $\sigma_i$ represents a standard deviation of current flowing through the node i, and $\langle F \rangle$ represents average current.

Step A4 is to calculate an electrical betweenness of a branch, $$Q(i, j) = \left| \sum_{m \in F, n \in L} w_{mn} P_{ij}(m, n) \right|,$$

where F is a set of electrical energy supply nodes, L is a set of load nodes; $P_{ij}(m, n)$ is a power generated by an electrical energy supply node m and a load node n with a direction thereof from the node m to the node n; $w_{mn}$ is a weighting coefficient of a branch from the node m to the node n.

Step A5 is to calculate a failure probability of each node according to the parameters, such as $G_i$, $r_{ij}$ or the like obtained in Step A, wherein a failure probability of a node i is $$Pr(i) = \beta_i \frac{M_i G_i d_i}{r_{ij} C_i \langle F_i \rangle},$$

where $d_i$ is a distance of a node i, and $\beta_i$ is a value for the laying mode of the node i, the value being one of values under two situations of overhead line laying and cable trench laying; $C_i$ is the convergence of the node i, which is defined as $$C_i = \frac{\hat{D} - D}{\hat{D}},$$

wherein D is the convergency degree of the network node i, $\hat{D}$ is the convergency degree after topology simplification, and $$D = \frac{N}{\bar{d}},$$

wherein $\bar{d}$ represents the average link length of the distribution network, N is the total number of nodes in the network; the sum of out-degree and in-degree is collectively referred to as degree, indicated by a symbol $M_i$.

A6 is to calculate a relative node betweenness, $$\hat{Q}_D(k) = \frac{Q_D(k)}{\overline{Q}_D},$$

wherein $\overline{Q}_D$ is an average electrical betweenness of all nodes, and $Q_D(k)$ represents an electrical betweenness of a load node k;

A7 is to calculate a relative branch betweenness, wherein a relative betweenness of a branch i–j is $$\hat{Q}_E(i, j) = \frac{Q_E(i, j)}{\overline{Q}_E},$$

where $\overline{Q}_E$ is an average electrical betweenness of all branches, and $Q_E(i, f)$ represents the electrical betweenness of the branch i–j.

A8 is to calculate loads of each node and each branch, $P_D(k)=\overline{P}_D \cdot \hat{Q}_D(k)$ and $P_E(i, j)=\overline{P}_E \cdot \hat{Q}_E(i, j)$, wherein $\overline{P}_D$ is an average node load, and $\overline{P}_E$ is an average edge load.

A9 is to calculate a length of a feature path, $$L = \frac{2}{N(N-1)} \sum_{i,j \in V} u_{ij},$$

wherein L is the length of the feature path, N represents the number of nodes in the considered network, $\mu_{ij}$ is the shortest path distance between the node i and the node j, and V is a set of all scope nodes in the considered network.

Figure 3:
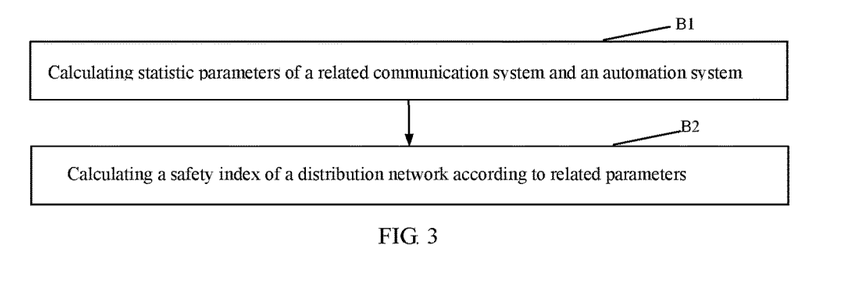
FIG. 3 is a calculating flowchart of a safety index of the medium voltage distribution network in the method in Embodiment 1 of the present invention.

The calculating flow of the safety index of the medium voltage distribution network is as shown in FIG. 3 and specific steps are as follows:

Step B1 is to perform statistics of related parameters: a large-area failure probability τ of a distribution network communication system, a failure probability M of a mobile cellular network, a failure probability W of a wireless sensor network, a failure probability F of optical fiber communication (EPON and GPON), and a defeat trip probability J of an automation system.

Figure 4:
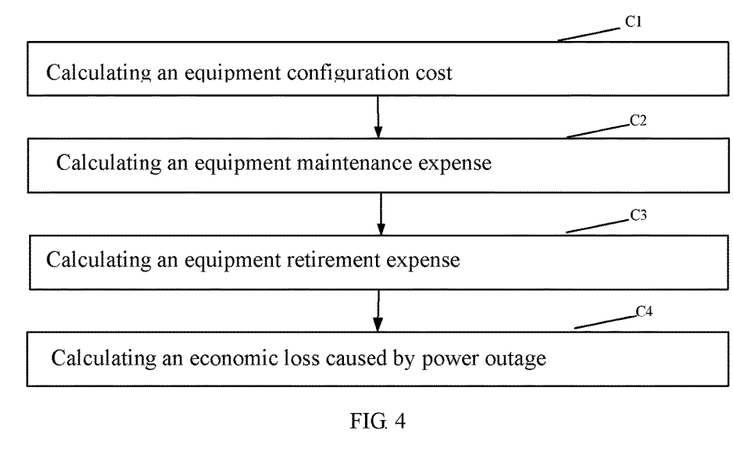
FIG. 4 is a calculating flowchart of an economical efficiency index of the medium voltage distribution network in the method in Embodiment 1 of the present invention.

Step B2 is to calculate a safety index of the distribution network as S=1–τ·M·W·F·J. The calculating flow of the electrical efficiency index of the medium voltage distribution network is as shown in FIG. 4, and specific steps are as follows:

Step C1 is to calculate an equipment configuration cost, $$M = \sum_{i=1}^{m} \left[ \frac{k(1+k)n_i}{(1+k)^{n_i} - 1} p_i + s_i \right],$$

where $s_i$ is a cost for purchasing each equipment, m represents the number of items for the equipment configuration cost, $n_i$ represents a service life of equipment i, k represents an interest per year on a purchase fund, and $p_i$ is front-end investment for the equipment i.

Step C2 is to calculate an equipment maintenance expense, $$R = \sum_{i=1}^{n} r_i + K,$$

wherein $r_i$ represents a maintenance expense of item i, and K represents a maintenance expense of an entire network.

C3, calculating an equipment retirement expense, $$X = \sum_{i=1}^{l} \left[ \frac{k(1+k)n_i}{(1+k)^{n_i} - 1} Q_i \right] - Z,$$

wherein l is a number of equipment, $Q_i$ is a retirement expense of equipment i, Z is an expense for selling retirement equipment, and $n_i$ represents a service life of equipment i.

Step C4 is to calculate an economic loss caused by power outage, $O=\mu A_{zc}d+Q(i,j)\bar{c}+Pr(i)\bar{e}$, wherein $A_{zc}$ is an amount of power shortage corresponding to each of different neutral point grounding modes, $\mu$ is an time period coefficient of the power outage loss, and d is a ratio of a power generation quantity to a power consumption quantity; $\bar{c}$ is an average economic loss of failure per unit area; $\bar{e}$ represents an economic loss of failure per unit node; $Q(i,j)$ represents an electrical betweenness of a branch; and $Pr(i)$ represents a failure probability of a node i.

Figure 5:
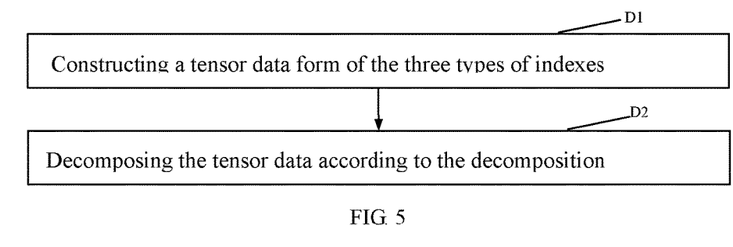
FIG. 5 is a flowchart of construction and decomposition of tensor data of the medium voltage distribution network in the method in Embodiment 1 of the present invention.

The flow of construction and decomposition of tensor data of the medium voltage distribution network is as shown in FIG. 5, and specific steps are as follows:

Step D1 is to, according to the above three types of indexes, construct a tensor data form with a tensor machine represented in a form of p: $p:U \times V \times C_1 \times C_2 \times L \times C_n \rightarrow D$; wherein data is defined as $P \in p^{n \times m \times k}$, and U, V and C represent k indexes of economical efficiency, m indexes of safety of the distribution network, and n indexes of power supply reliability of the distribution network, respectively.

Step D2 is to, according to the nature of the decomposition uniqueness of a three-dimensional matrix, decompose a data matrix $P \in p^{n \times m \times k}$ into $\hat{P}=G^{(m)} \times_1 U^{(1)} \times_2 V^{(2)} \times_3 \hat{P}_{i_3}^{(3)}$, wherein $\hat{P}$ represents a decomposition matrix of data, $G^{(m)}$, $U^{(1)}$, $V^{(2)}$ and $\hat{P}_{i_3}^{(3)}$ represent a neutral point grounding mode after decomposition, k indexes for the economical efficiency, m indexes for the safety of the distribution network, and n indexes for the power supply reliability of the distribution network, respectively.

Figure 6:
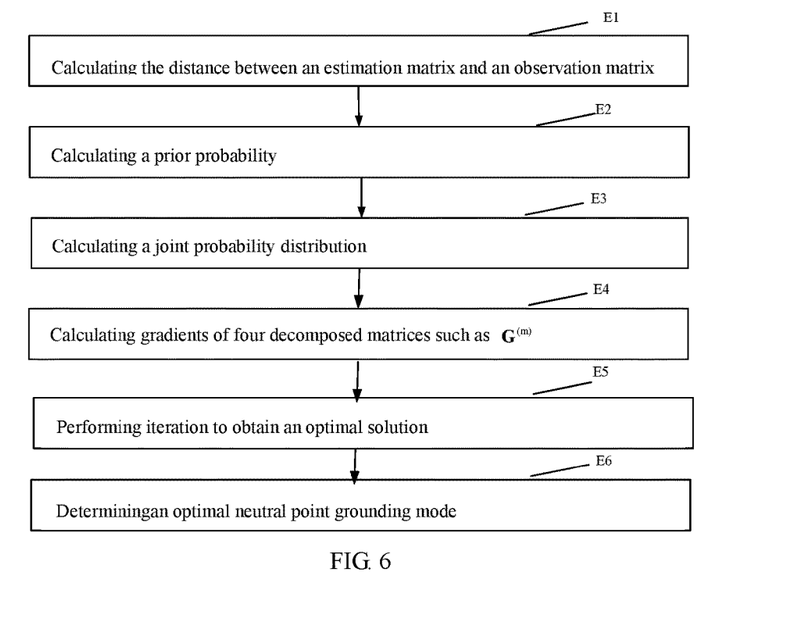
FIG. 6 is a flowchart of determination of an optimal neutral point grounding mode in the method in Embodiment 1 of the present invention.

The flow of the optimal neutral point grounding mode decision method is as shown in FIG. 6, and specific steps are as follows:

Step E1 is to define a distance between an estimation matrix and an observation matrix, $$L(\hat{P}_{i_3}^{(3)}, P_{i_3}^{(3)}) = \frac{\hat{P}_{i_3}^{(3)} \otimes P_{i_3}^{(3)}}{tr(\|\hat{P}_{i_3}^{(3)}\|_F)tr(\|P_{i_3}^{(3)}\|_F)},$$

where $\otimes$ represents a tensor machine of a matrix and $\|\cdot\|_F$ represents the Frobenius norm of a matrix; tr ($\bullet$) represents trace of a matrix; $\hat{P}_{i_3}^{(3)}$ represents the observation matrix and $P_{i_3}^{(3)}$ represents the estimation matrix.

Step E2 is to calculate a prior probability, $p(C_{j:})=N(c_{j:}|\mu_{c_j}, \Sigma)$, wherein its mean and variance are $\mu_{c_j}$ and $\Sigma$, respectively; N ($\bullet$) is a normal distribution, $C_{j:}$ is a power supply reliability index j.

Step E3 is to calculate a joint probability distribution, $p(C_{j:}, G^{(m)}|_{m=1}^4, U^{(1)}, V^{(2)}, \hat{P}_{i_3}^{(3)})$, in which there are $G^{(m)}$, $U^{(1)}$, $V^{(2)}$ and $\hat{P}_{i_3}^{(3)}$, wherein $G^{(m)}$ represents a neutral point grounding mode, $U^{(1)}$ represents an economical efficiency index after decomposition, $V^{(2)}$ represents a safety index after decomposition, and $\hat{P}_{i_3}^{(3)}$ represents a power supply reliability index after decomposition.

Step E4 is to calculate gradients of $G^{(m)}$, $U^{(1)}$, $V^{(2)}$ and $\hat{P}_{i_3}^{(3)}$.

Step E5 is to perform iteration to obtain optimal $U^{(1)}$, $V^{(2)}$, $\hat{P}_{i_3}^{(3)}$ and $G^{(m)}$.

Step E6 is to obtain a grounding mode, under which the objective function is minimized, according to different neutral point grounding modes.

Embodiment 2

This embodiment provides a neutral point grounding mode decision system for a medium voltage distribution network, including:

a power supply reliability related index calculation unit to construct a power supply reliability evaluation system according to a topological structure of a medium voltage distribution network and calculate a related index;

a safety-related index calculation unit to calculate a safety-related index of the distribution network according to related factors that affect the safety;

an economical efficiency-related index calculation unit to construct an economic evaluation index system of the distribution network and calculate a related index;

a multi-index tensor data constructing and decomposing unit to construct the power supply reliability index, the safety index of the distribution network and the economic evaluation index of the distribution network into a tensor form and decompose the tensor form; and an optimal neutral point grounding mode determining unit to construct a support tensor machine kernel function, determine an optimization function and obtain an optimal neutral point grounding mode via analysis.

As a supplement to the above neutral point grounding mode decision system, the multi-index tensor data constructing and decomposing unit comprises:

a distance calculation module for an estimation matrix and an observation matrix to calculate the distance between the estimation matrix and the observation matrix;

a prior probability calculation module to calculate a prior probability;

a joint probability calculation module to calculate a joint probability; and a decomposed matrix gradient calculation module to calculate a gradient of a decomposed matrix.

The above embodiments are only for illustrating the present invention, but not intended to limit the present invention. Those of ordinary skill in the art may also make various changes and modifications without departing from the spirit and scope of the present invention. Therefore, all equivalent technical solutions shall also fall within the scope of the present invention, and the patent protection scope of the present invention should be defined by the claims.

The invention claimed is:

1. A support tensor machine based neutral point grounding mode decision method, comprising:

Step A, constructing a power supply reliability evaluation system according to a topological structure of a medium voltage distribution network and calculating a related index;

Step B, calculating a safety-related index of the distribution network according to related factors that affect the safety;

Step C, constructing an economic evaluation index system of the distribution network and calculating a related index;

Step D, constructing the power supply reliability index, the safety index of the distribution network and the economic evaluation index of the distribution network into a tensor form and decomposing the tensor form; and Step E, constructing a support tensor machine kernel function, determining an optimization function and obtaining an optimal neutral point grounding mode via analysis.

2. The neutral point grounding mode decision method according to claim 1, wherein Step A specifically comprises the following steps:

A1, constructing a topology G=(V, E) of a network structure according to the structure of the distribution network, wherein V represents a set of all nodes, and E represents a set of edges connecting all the nodes;

A2, calculating a weight value $r_{ij}$ of a branch, $r_{ij}=\alpha_m d_{ij}$, i, j=1,2,3 . . . ,n; m=1,2, . . . ,k; wherein $d_{ij}$ is a distance between nodes, and $\alpha_m$ represents weighting coefficients in different scenarios;

A3, calculating a node current fluctuation value, $$G_i = \frac{\sigma_i}{\langle F_i \rangle - \sigma_i},$$

wherein $\sigma_i$ represents a standard deviation of current flowing through anode i, and $\langle F_i \rangle$ represents average current;

A4, calculating an electrical betweenness of a branch, $$Q(i,j) = \left| \sum_{m \in F, n \in L} w_{mn} P_{ij}(m,n) \right|,$$

wherein F is a set of electrical energy supply nodes, L is a set of load nodes; $P_{ij}(m, n)$ represents a power generated by an electrical energy supply node m and a load node n, with a direction thereof from the node m to the node n; $w_{mn}$ is a weighting coefficient of a branch from the node m to the node n;

A5, calculating a failure probability of each node according to the parameters, such as $G_i$, $r_{ij}$ or the like obtained in Step A, wherein a failure probability of a node i is $$Pr(i) = \beta_i \frac{M_i G_i d_i}{r_{ij} C_i \langle F_i \rangle},$$

wherein $d_i$ is a distance of a node i, and $\beta_i$ is a value for the laying mode of the node i, the value being one of values under two situations of overhead line laying and cable trench laying; $C_i$ is the convergence of the node i, which is defined as $$C_i = \frac{\hat{D} - D}{\hat{D}},$$

wherein D is the convergency degree of the network node i, $\hat{D}$ is the convergency degree after topology simplification, and $$D = \frac{N}{d},$$

wherein d represents the average link length of the distribution network, N is the total number of nodes in the network; the sum of out-degree and in-degree is collectively referred to as degree, indicated by a symbol $M_i$;

A6, calculating a relative nodebetweenness, $$\hat{Q}_D(k) = \frac{Q_D(k)}{\overline{Q}_D},$$

wherein $\overline{Q}_D$ is an average electrical betweenness of all nodes, and $Q_D(k)$ represents an electrical betweenness of a load node k;

A7, calculating a relative betweenness of a branch, wherein a relative betweenness of a branch i–j is $$\hat{Q}_E(i,j) = \frac{Q_E(i,j)}{\overline{Q}_E},$$

where $\overline{Q}_E$ is an average electrical betweenness of all branches, and $Q_E(i, j)$ represents the electrical betweenness of the branch i–j;

A8, calculating loads of each node and each branch, $P_D(k)=\overline{P}_D \cdot \hat{Q}_D(k)$ and $P_E(i,j)=\overline{P}_E \cdot \hat{Q}_E(i,j)$, wherein $\overline{P}_D$ is an average node load, and $\overline{P}_E$ is an average edge load; and A9, calculating a length of a feature path, $$L = \frac{2}{N(N-1)} \sum_{i,j \in V} u_{ij},$$

wherein L is the length of the feature path, N represents the number of nodes in the considered network, $u_{ij}$ is the shortest path distance between the node i and the node j, and V is a set of all scopenodes in the considered network.

3. The neutral point grounding mode decision method according to claim 2, wherein in Step A2, according to an environment in which the line is located, the weighting coefficient has a value range of $0 < \alpha_m \leq 1$.

4. The neutral point grounding mode decision method according to claim 3, wherein Step B specifically comprises the following steps:

B1, performing statistics of related parameters: a large-area failure probability τ of a distribution network communication system, a failure probability M of a mobile cellular network, a failure probability W of a wireless sensor network, a failure probability F of optical fiber communication, and a defeat trip probability J of an automation system; and B2, calculating a safety index of a distribution network as S=1–τ·M·W·F·J.

5. The neutral point grounding mode decision method according to claim 3, wherein Step C specifically comprises the following steps:

C1, calculating an equipment configuration cost, $$M = \sum_{i=1}^{m} \left[ \frac{k(1+k)n_i}{(1+k)^{n_i} - 1} p_i + s_i \right],$$

wherein $s_i$ is a cost for purchasing each equipment, m represents the number of items for the equipment configuration cost, $n_i$ represents a service life of equipment i, k represents an interest per year on a purchase fund, and $p_i$ is front-end investment for the equipment i;

C2, calculating an equipment maintenance expense, $$R = \sum_{i=1}^{n} r_i + K,$$

wherein $r_i$ represents a maintenance expense of item i, and K represents a maintenance expense of an entire network;

C3, calculating an equipment retirement expense, $$X = \sum_{i=1}^{l} \left[ \frac{k(1+k)n_i}{(1+k)^{n_i} - 1} Q_i \right] - Z,$$

wherein l is a number of equipment, $Q_i$ is a retirement expense of equipment i, Z is an expense for selling retirement equipment, $n_i$ represents a service life of equipment i, and k represents an interest per year on a purchase fund; and C4, calculating an economic loss caused by power outage, $O=\mu A_{zc}d+Q(i,j)\bar{c}+Pr(i)\bar{e}$, wherein $A_{zc}$ is an amount of power shortage corresponding to each of different neutral point grounding modes, $\mu$ is the time period coefficient of the power outage loss, and d is a ratio of a power generation quantity to a power consumption quantity; $\bar{c}$ is an average economic loss of failure per unit area; $\bar{e}$ represents an economic loss of failure per unit node; $Q(i,j)$ represents an electrical betweenness of a branch; and $Pr(i)$ represents a failure probability of a node i.

6. The neutral point grounding mode decision method according to claim 5, wherein when power outage takes place in a period of power consumption peak, the value of $\mu$ is 2, or otherwise, the value of $\mu$ is 1.

7. The neutral point grounding mode decision method according to claim 3, wherein Step D specifically comprises the following steps:

D1, according to the above three types of indexes, constructing a tensor data form with its tensor machine represented in a form of $p: U \times V \times C_1 \times C_2 \times L \times C_n \rightarrow D$; wherein data is defined as $P \in p^{n \times m \times k}$, and U, V and C represent k indexes for economical efficiency, m indexes for safety of a distribution network, and n indexes for power supply reliability of the distribution network, respectively; and D2, according to the nature of the decomposition uniqueness of a three-dimensional matrix, decomposing a data matrix $P \in P^{n \times m \times k}$ into $\hat{P} = G^{(m)} \times_1 U^{(1)} \times_2 V^{(2)} \times_3 \hat{P}_{i_3}^{(3)}$, wherein $\hat{P}$ represents a decomposition matrix of data, $G^{(m)}$, $U^{(1)}$, $V^{(2)}$ and $\hat{P}_{i_3}^{(3)}$ represent a neutral point grounding mode after decomposition, k indexes for the economical efficiency, m indexes for the safety of the distribution network, and n indexes for the power supply reliability of the distribution network, respectively.

8. The neutral point grounding mode decision method according to claim 2, wherein Step B specifically comprises the following steps:

B1, performing statistics of related parameters: a large-area failure probability $\tau$ of a distribution network communication system, a failure probability M of a mobile cellular network, a failure probability W of a wireless sensor network, a failure probability F of optical fiber communication, and a defeat trip probability J of an automation system; and B2, calculating a safety index of a distribution network as $S = 1 - \tau \cdot M \cdot W \cdot F \cdot J$.

9. The neutral point grounding mode decision method according to claim 2, wherein Step C specifically comprises the following steps:

C1, calculating an equipment configuration cost, $$M = \sum_{i=1}^{m} \left[ \frac{k(1+k)n_i}{(1+k)^{n_i} - 1} p_i + s_i \right],$$

wherein $s_i$ is a cost for purchasing each equipment, m represents the number of items for the equipment configuration cost, $n_i$ represents a service life of equipment i, k represents an interest per year on a purchase fund, and $p_i$ is front-end investment for the equipment i;

C2, calculating an equipment maintenance expense, $$R = \sum_{i=1}^{n} r_i + K,$$

wherein $r_i$ represents a maintenance expense of item i, and K represents a maintenance expense of an entire network;

C3, calculating an equipment retirement expense, $$X = \sum_{i=1}^{l} \left[ \frac{k(1+k)n_i}{(1+k)^{n_i} - 1} Q_i \right] - Z,$$

wherein l is a number of equipment, $Q_i$ is a retirement expense of equipment i, Z is an expense for selling retirement equipment, $n_i$ represents a service life of equipment i, and k represents an interest per year on a purchase fund; and C4, calculating an economic loss caused by power outage, $O=\mu A_{zc}d+Q(i,j)\bar{c}+Pr(i)\bar{e}$, wherein $A_{zc}$ is an amount of power shortage corresponding to each of different neutral point grounding modes, $\mu$ is the time period coefficient of the power outage loss, and d is a ratio of a power generation quantity to a power consumption quantity; $\bar{c}$ is an average economic loss of failure per unit area; $\bar{e}$ represents an economic loss of failure per unit node; $Q(i,j)$ represents an electrical betweenness of a branch; and $Pr(i)$ represents a failure probability of a node i.

10. The neutral point grounding mode decision method according to claim 9, wherein when power outage takes place in a period of power consumption peak, the value of $\mu$ is 2, or otherwise, the value of $\mu$ is 1.

11. The neutral point grounding mode decision method according to claim 2, wherein Step D specifically comprises the following steps:

D1, according to the above three types of indexes, constructing a tensor data form with its tensor machine represented in a form of $p: U \times V \times C_1 \times C_2 \times L \times C_n \rightarrow D$; wherein data is defined as $P \in p^{n \times m \times k}$, and U, V and C represent k indexes for economical efficiency, m indexes for safety of a distribution network, and n indexes for power supply reliability of the distribution network, respectively; and D2, according to the nature of the decomposition uniqueness of a three-dimensional matrix, decomposing a data matrix $P \in p^{n \times m \times k}$ into $\hat{P} = G^{(m)} \times_1 U^{(1)} \times_2 V^{(2)} \times_3 \hat{P}_{i_3}^{(3)}$, wherein $\hat{P}$ represents a decomposition matrix of data, $G^{(m)}$, $U^{(1)}$, $V^{(2)}$ and $\hat{P}_{i_3}^{(3)}$ represent a neutral point grounding mode after decomposition, k indexes for the economical efficiency, m indexes for the safety of the distribution network, and n indexes for the power supply reliability of the distribution network, respectively.

12. The neutral point grounding mode decision method according to claim 3, wherein Step E specifically comprises the following steps:

E1, defining the distance between an estimation matrix and an observation matrix, $$L(\hat{P}_{i_3}^{(3)}, P_{i_3}^{(3)}) = \frac{\hat{P}_{i_3}^{(3)} \otimes P_{i_3}^{(3)}}{tr(\|\hat{P}_{i_3}^{(3)}\|_F)tr(\|P_{i_3}^{(3)}\|_F)},$$

wherein $\otimes$ represents a tensor machine of a matrix and $\|\cdot\|_F$ represents the Frobenius norm of a matrix; $tr(\cdot)$ represents trace of a matrix; $\hat{P}_{i_3}^{(3)}$ represents the observation matrix and $P_{i_3}^{(3)}$ represents the estimation matrix;

E2, calculating a prior probability, $p(C_{j:})=N(c_{j:}|\mu_{c_j}, \Sigma)$, wherein its mean value and variance are $\mu_{c_j}$ and $\Sigma$ respectively; $N(\cdot)$ is a normal distribution, $C_{j:}$ is a power supply reliability index j;

E3, calculating a joint probability distribution, $p(C_{j:}; G^{(m)}|_{m=1}^4, U^{(1)}, V^{(2)}, \hat{P}_{i_3}^{(3)})$, in which there are $G^{(m)}$, $U^{(1)}$, $V^{(2)}$ and $\hat{P}_{i_3}^{(3)}$, wherein $G^{(m)}$ represents a neutral point grounding mode, $U^{(1)}$ represents an economical efficiency index after decomposition, $V^{(2)}$ represents a safety index after decomposition, and $\hat{P}_{i_3}^{(3)}$ represents a power supply reliability index after decomposition;

E4, calculating gradients of $G^{(m)}$, $U^{(1)}$, $V^{(2)}$ and $\hat{P}_{i_3}^{(3)}$;

E5, performing iteration to obtain optimal $U^{(1)}$, $V^{(2)}$, $\hat{P}_{i_3}^{(3)}$ and $G^{(m)}$; and E6, obtaining a grounding mode, under which the objective function is minimized, according to different neutral point grounding modes.

13. The neutral point grounding mode decision method according to claim 1, wherein Step B specifically comprises the following steps:

B1, performing statistics of related parameters: a large-area failure probability $\tau$ of a distribution network communication system, a failure probability M of a mobile cellular network, a failure probability W of a wireless sensor network, a failure probability F of optical fiber communication, and a defeat trip probability J of an automation system; and B2, calculating a safety index of a distribution network as $S=1-\tau \cdot M \cdot W \cdot F \cdot J$.

14. The neutral point grounding mode decision method according to claim 1, wherein Step C specifically comprises the following steps:

C1, calculating an equipment configuration cost, $$M = \sum_{i=1}^{m} \left[ \frac{k(1+k)n_i}{(1+k)^{n_i}-1} p_i + s_i \right],$$

where $s_i$ is a cost for purchasing each equipment, m represents the number of items for the equipment configuration cost, $n_i$ represents a service life of equipment i, k represents an interest per year on a purchase fund, and $p_i$ is front-end investment for the equipment i;

C2, calculating an equipment maintenance expense, $$R = \sum_{i=1}^{n} r_i + K,$$

wherein $r_i$ represents a maintenance expense of item i, and K represents a maintenance expense of an entire network;

C3, calculating an equipment retirement expense, $$X = \sum_{i=1}^{l} \left[ \frac{k(1+k)n_i}{(1+k)^{n_i}-1} Q_i \right] - Z,$$

wherein l is a number of equipment, $Q_i$ is a retirement expense of equipment i, Z is an expense for selling retirement equipment, $n_i$ represents a service life of equipment i, and k represents an interest per year on a purchase fund; and C4, calculating an economic loss caused by power outage, $O=\mu A_{zc}d+Q(i,j)\bar{c}+Pr(i)\bar{e}$, wherein $A_{zc}$ is an amount of power shortage corresponding to each of different neutral point grounding modes, $\mu$ is the time period coefficient of the power outage loss, and d is a ratio of a power generation quantity to a power consumption quantity; $\bar{c}$ is an average economic loss of failure per unit area; $\bar{e}$ represents an economic loss of failure per unit node; $Q(i, j)$ represents an electrical betweenness of a branch; and $Pr(i)$ represents a failure probability of a node i.

15. The neutral point grounding mode decision method according to claim 14, wherein when power outage takes place in a period of power consumption peak, the value of $\mu$ is 2, or otherwise, the value of $\mu$ is 1.

16. The neutral point grounding mode decision method according to claim 1, wherein Step D specifically comprises the following steps:

D1, according to the above three types of indexes, constructing a tensor data form with its tensor machine represented in a form of $p:U\times V\times C_1\times C_2\times L\times C_n\rightarrow D$; wherein data is defined as $P\in p^{n\times m\times k}$, and U, V and C represent k indexes for economical efficiency, m indexes for safety of a distribution network, and n indexes for power supply reliability of the distribution network, respectively; and D2, according to the nature of the decomposition uniqueness of a three-dimensional matrix, decomposing a data matrix $P\in p^{n\times m\times k}$ into $\hat{P}=G^{(m)}\times_1 U^{(1)}\times_2 V^{(2)}\times_3 \hat{P}_{i_3}^{(3)}$, wherein $\hat{P}$ represents a decomposition matrix of data, $G^{(m)}$, $U^{(1)}$, $V^{(2)}$ and $\hat{P}_{i_3}^{(3)}$ represent a neutral point grounding mode after decomposition, k indexes for the economical efficiency, m indexes for the safety of the distribution network, and n indexes for the power supply reliability of the distribution network, respectively.

17. The neutral point grounding mode decision method according to claim 1, wherein Step E specifically comprises the following steps:

E1, defining the distance between an estimation matrix and an observation matrix, $$L(\hat{P}_{i_3}^{(3)}, P_{i_3}^{(3)}) = \frac{\hat{P}_{i_3}^{(3)} \otimes P_{i_3}^{(3)}}{tr(\|\hat{P}_{i_3}^{(3)}\|_F)tr(\|P_{i_3}^{(3)}\|_F)},$$

wherein $\otimes$ represents a tensor machine of a matrix and $\|\cdot\|_F$ represents the Frobenius norm of a matrix; $tr(\cdot)$ represents trace of a matrix; $\hat{P}_{i_3}^{(3)}$ represents the observation matrix and $P_{i_3}^{(3)}$ represents the estimation matrix;

E2, calculating a prior probability, $p(C_{j:})=N(c_{j:}|\mu_{c_j}, \Sigma)$, wherein its mean value and variance are $\mu_{c_j}$ and $\Sigma$ respectively; $N(\cdot)$ is a normal distribution, $C_{j:}$ is a power supply reliability index j;

E3, calculating a joint probability distribution, $p(C_{j:}; G^{(m)}|_{m=1}^4, U^{(1)}, V^{(2)}, \hat{P}_{i_3}^{(3)})$, in which there are $G^{(m)}$, $U^{(1)}$, $V^{(2)}$ and $\hat{P}_{i_3}^{(3)}$, wherein $G^{(m)}$ represents a neutral point grounding mode, $U^{(1)}$ represents an economical efficiency index after decomposition, $V^{(2)}$ represents a safety index after decomposition, and $\hat{P}_{i_3}^{(3)}$ represents a power supply reliability index after decomposition;

E4, calculating gradients of $G^{(m)}$, $U^{(1)}$, $V^{(2)}$ and $\hat{P}_{i_3}^{(3)}$;

E5, performing iteration to obtain optimal $U^{(1)}$, $V^{(2)}$, $\hat{P}_{i_3}^{(3)}$ and $G^{(m)}$; and E6, obtaining a grounding mode, under which the objective function is minimized, according to different neutral point grounding modes.

18. The neutral point grounding mode decision method according to claim 1, wherein Step E specifically comprises the following steps:

E1, defining the distance between an estimation matrix and an observation matrix, $$L(\hat{P}_{i_3}^{(3)}, P_{i_3}^{(3)}) = \frac{\hat{P}_{i_3}^{(3)} \otimes P_{i_3}^{(3)}}{tr(\|\hat{P}_{i_3}^{(3)}\|_F) tr(\|P_{i_3}^{(3)}\|_F)},$$

wherein $\otimes$ represents a tensor machine of a matrix and $\|\cdot\|_F$ represents the Frobenius norm of a matrix; $tr(\cdot)$ represents trace of a matrix; $\hat{P}_{i_3}^{(3)}$ represents the observation matrix and $\hat{P}_{i_3}^{(3)}$ represents the estimation matrix;

E2, calculating a prior probability, $p(C_{j\cdot}) = N(c_{j\cdot}|\mu_{c_j}, \Sigma)$, wherein its mean value and variance are $\mu_{c_j}$ and $\Sigma$ respectively; $N(\cdot)$ is a normal distribution, $C_{j\cdot}$ is a power supply reliability index $j$;

E3, calculating a joint probability distribution, $p(C_{j\cdot}; G^{(m)}|_{m=1}^4, U^{(1)}, V^{(2)}, \hat{P}_{i_3}^{(3)})$, in which there are $G^{(m)}$, $U^{(1)}$, $V^{(2)}$ and $\hat{P}_{i_3}^{(3)}$, wherein $G^{(m)}$ represents a neutral point grounding mode, $U^{(1)}$ represents an economical efficiency index after decomposition, $V^{(2)}$ represents a safety index after decomposition, and $\hat{P}_{i_3}^{(3)}$ represents a power supply reliability index after decomposition;

E4, calculating gradients of $G^{(m)}$, $U^{(1)}$, $V^{(2)}$ and $\hat{P}_{i_3}^{(3)}$;

E5, performing iteration to obtain optimal $U^{(1)}$, $V^{(2)}$, $\hat{P}_{i_3}^{(3)}$ and $G^{(m)}$; and E6, obtaining a grounding mode, under which the objective function is minimized, according to different neutral point grounding modes.

19. A support tensor machine based neutral point grounding mode decision system, comprising:

a power supply reliability related index calculation unit to construct a power supply reliability evaluation system according to a topological structure of a medium voltage distribution network and calculate a related index;

a safety-related index calculation unit to calculate a safety-related index of the distribution network according to related factors that affect the safety;

an economical efficiency-related index calculation unit to construct an economic evaluation index system of the distribution network and calculate a related index;

a multi-index tensor data constructing and decomposing unit to construct the power supply reliability index, the safety index of the distribution network and the economic evaluation index of the distribution network into a tensor form and decompose the tensor form; and an optimal neutral point grounding mode determining unit to construct a support tensor machine kernel function, determine an optimization function and obtain an optimal neutral point grounding mode via analysis.

20. The neutral point grounding mode decision system according to claim 19, wherein the multi-index tensor data constructing and decomposing unit comprises:

A distance calculation module for an estimation matrix and an observation matrix to calculate the distance between the estimation matrix and the observation matrix;

a prior probability calculation module to calculate a prior probability;

a joint probability calculation module to calculate a joint probability; and a decomposed matrix gradient calculation module to calculate a gradient of a decomposed matrix.

* * * * *